US00RE37373B1

(19) United States
(12) Reissued Patent
Tsubouchi et al.

(10) Patent Number: US RE37,373 E
(45) Date of Reissued Patent: Sep. 18, 2001

(54) VACUUM SERVO APPARATUS

(75) Inventors: Kaoru Tsubouchi, Toyota; Akihiko Miwa, Anjo, both of (JP)

(73) Assignee: Aisin Seiki Kabushiki Kaisha, Kariya (JP)

(21) Appl. No.: 09/434,111

(22) Filed: Nov. 4, 1999

Related U.S. Patent Documents

Reissue of:
(64) Patent No.: 5,683,147
Issued: Nov. 4, 1997
Appl. No.: 08/668,132
Filed: Jun. 21, 1996

(30) Foreign Application Priority Data

Jun. 22, 1995 (JP) ..... 7-179467

(51) Int. Cl.[7] ..... B60T 13/68; F15B 9/10
(52) U.S. Cl. ..... 303/114.3; 188/356
(58) Field of Search ..... 303/113.4, 114.3, 303/114.1, 114.2, 155, 3, 14–15, 135, 125, 113.1, 113.3, 113.2, 193; 188/356, 357, 358, 359; 60/547.1, 550, 553, 567, 576, 554, 555, 552, 534, 556; 91/369.1–369.4, 367, 376 R, 391 R, 391 A; 180/169

(56) References Cited

U.S. PATENT DOCUMENTS

| | | | | |
|---|---|---|---|---|
| 3,780,620 | * | 12/1973 | Gardner . | |
| 3,795,426 | * | 3/1974 | Sisson | 60/534 |
| 3,990,241 | * | 11/1976 | Owens | 60/563 |
| 4,033,131 | * | 7/1977 | Gardner | 60/553 |
| 4,620,750 | * | 11/1986 | Leiber . | |
| 4,773,301 | * | 9/1988 | Shimamura et al. . | |
| 4,893,691 | * | 1/1990 | Park . | |
| 4,979,426 | * | 12/1990 | Schiel et al. | 91/369.1 |
| 5,096,267 | * | 3/1992 | Volz | 303/113.3 |
| 5,171,072 | * | 12/1992 | Maehara | 303/114.1 |
| 5,236,257 | * | 8/1993 | Monzaki et al. | 303/114.1 |
| 5,350,225 | * | 9/1994 | Steiner et al. | 303/114.3 |
| 5,437,217 | * | 8/1995 | Castel et al. | 91/369.2 |
| 5,460,074 | | 10/1995 | Balz et al. . | |
| 5,479,844 | * | 1/1996 | Heibal et al. | 91/369.2 |
| 5,483,866 | * | 1/1996 | Schlüter | 91/367 |
| 5,493,946 | * | 2/1996 | Schlüter | 91/367 |
| 5,605,088 | | 2/1997 | Balz et al. . | |
| 5,607,209 | * | 3/1997 | Narita et al. . | |
| 5,645,145 | * | 7/1997 | Ikeda | 188/356 |
| 5,658,055 | * | 8/1997 | Dieringer et al. | 188/356 |
| 5,779,329 | * | 7/1998 | Takeshima | 303/113.4 |
| 5,845,556 | * | 12/1998 | Tsubouchi et al. | 91/367 |

FOREIGN PATENT DOCUMENTS

| | | | |
|---|---|---|---|
| 43 24 688 | | 1/1995 | (DE) . |
| 2230580 | * | 10/1990 | (GB) . |
| 6299255 | * | 5/1987 | (JP) . |
| 5-85350 | * | 4/1993 | (JP) . |

* cited by examiner

*Primary Examiner*—Douglas C. Butler
(74) *Attorney, Agent, or Firm*—Burns, Doane, Swecker & Mathis, LLP

(57) ABSTRACT

A vacuum servo apparatus in which, in a performance diagram having an input coordinate axis perpendicular to an output coordinate axis, the normal operation is represented by a first operating line and, after a plunger member is moved by a solenoid so that movement of the plunger member with respect to a transmission member is controlled, the operation is represented by a second operating line following additional jump biasing force to be supplemented and generated is appropriately set and an output of the apparatus is designed to be faster during the return stroke for straightforwardly reflecting the intention of the driver.

30 Claims, 7 Drawing Sheets

VACUUM SERVO APPARATUS

Matter enclosed in heavy brackets [ ] appears in the original patent but forms no part of this reissue specification; matter printed in italics indicates the additions made by reissue.

FIELD OF INVENTION

This invention relates to a vacuum servo apparatus and, more particularly, to a vacuum servo apparatus applied above all to a brake booster for a vehicle.

BACKGROUND OF THE INVENTION

Related Art

Heretofore, a vacuum assistor apparatus (also termed an negative pressure servo apparatus) has been adopted in a vehicle as a brake booster for reducing the operating force during braking.

The vacuum servo apparatus, in which the negative suction pressure of an engine or an negative pressure of a vacuum pump is used as a servo force and, using the pressure difference between this negative pressure and the atmospheric pressure, a force exceeding the foot pressure of a driver applied to a braking pedal is hydraulically applied to a braking device, is a most commonplace system as a brake booster.

In, for example, a German Patent DE 4405092C1, a vacuum servo apparatus having a mechanism producing "additional jumping", in which, if a brake pedal actuating speed by a vehicle driver exceeds a threshold value, e.g., during rapid braking, a solenoid in a servo apparatus is excited for adding and generating an output other than the biasing force by a driver's input, in association with the driving or braking conditions, has been proposed.

Meanwhile, the "additional jumping" means a phenomenon in which an output value in terms of an output/input ratio of a vacuum servo is rapidly increased in the absence of the input increase.

FIG. 8 illustrates a prior art and is a partial cross-sectional view of a vacuum servo apparatus proposed in the above German Patent DE 4405092C1, taken along the input/output shaft of the vacuum servo apparatus.

Referring to FIG. 8, the vacuum servo apparatus includes, in addition to detection means, not shown, adapted for detecting the brake pedal pressing velocity by a driver, a power piston 622 slidable along an input/output shaft 699 under a differential pressure between the negative pressure and the atmospheric pressure, and an input rod 644 on which is applied the foot pressure by the driver. The power piston 622 and the input rod 644 are provided on the outer periphery of the apparatus and on the inner periphery of the apparatus (within the power piston 622), respectively.

Along the axial line 699, looking from the input towards the output, there are mounted a transmission member 641, mutually interacting with the input rod 644, a reaction disc 648, abutted on the inner periphery and on the outer periphery thereof against the input rod 622 and against the power piston 622, respectively, and mutually interacting with the input rod 622, and an output rod 650 abutted against the reaction disc 648 and mutually interacting with the braking device. Between the outer periphery of the transmission member 641 and the power piston 622, there is provided a solenoid coil 640 extending parallel to the axial line 699, whereas, between the outer periphery of the transmission member 641 and the inner periphery of the solenoid coil, there is arranged a solenoid plunger 630 sucked towards the output under an electromagnetic force generated by the solenoid 640. The solenoid plunger 630 has an atmospheric valve element 632.

Between the outer periphery of the input rod 644 and the inner periphery of the power piston 622, there are provided an atmospheric valve 624 and a negative pressure valve 611. The atmospheric valve 624 is made up of a valve seat 660 retained by the power piston 622 and biased by a coil spring 700 towards an output side and the above-mentioned atmospheric valve element 632 facing the inner periphery of the output side end face of the valve seat 660. The atmospheric valve element 632 is provided in the solenoid plunger 630 and is extended along the input/output shaft 699. Between the atmospheric valve element 632 and the transmission member 641 is interposed a coil spring 638. The negative pressure valve 611 is made up of the valve seat 660 and an negative pressure valve element 623 facing the outer periphery of the output side end face of the valve seat 660 and formed within the inside of the power piston 622 for encircling the outer periphery of the atmospheric valve element 632.

It is only the surface formed on the reaction disc retainer 622 for facing the forward end face of the solenoid plunger 630 that operates as a stop for restricting movement of the atmospheric element 632 towards the output side. In addition, there is no clearance between the transmission member 641 and the reaction member 648. Therefore, the opening degree of the atmospheric valve 624 is substantially equal to the initial distance between the forward end face of the solenoid plunger 630 and the face of the reaction disc retainer 622 facing the froward end face, that is a clearance shown in FIG. 6. This distance corresponds to the maximum opening degree.

The operation of the vacuum servo apparatus shown in FIG. 8 is explained by referring to FIGS. 8 and 9. In the graph of FIG. 9, showing the performance of the vacuum servo apparatus, lines a, c denote operating lines for usual braking and for the case in which the solenoid of the conventional vacuum servo apparatus is excited for supplementing and generating an output other than a biasing force imposed by the input.

If an input $f_1$ is applied by a driver on the input rod 644, the vacuum servo apparatus generates an output $a_1$. If, in the course of application of the input $f_1$ is applied, the solenoid in the servo apparatus is excited, as a result of detection of the emergency braking state or for other reasons, for supplementing and generating an output other than the biasing force by the input.

The solenoid plunger 630 is moved towards the output side under the electromagnetic force generated by the solenoid coil 640 so that the forward end face of the solenoid plunger 630 is abutted against a surface formed on the reaction disc retainer 622 for facing the forward end face. The atmospheric valve element 632 provided on the solenoid plunger 630 is also moved towards the output side for opening the valve 624 to permit atmospheric air to be intruded into a variable pressure chamber for generating a force of driving the power piston 622 towards the output side.

The reaction member 648 is elastically deformed by the thrusting force exerted by the power piston 622 for generating a force of reaction for thrusting back the input member 641 so that the input member 641 and the input rod 644 is moved towards the input side. However, since the atmospheric valve 632 is not moved towards the input side, the atmospheric valve 624 keeps on to be opened, so that the pressure within the variable pressure chamber reaches the atmospheric pressure. Thus the vacuum servo apparatus is in the maximum assisting state and generates an output $c_1$. Subsequently, the vacuum servo apparatus operates on a line c.

That is, if current is supplied through the solenoid coil 640 at an input $f_1$ an output jumps at once to $c_1$ from an output $a_1$ under an additional jumping.

SUMMARY OF THE DISCLOSURE

Problem to be Solved by the Invention

However, the conventional vacuum servo apparatus, proposed in, for example, the above German Patent DE 4405092Cb1, has the following disadvantages.

Referring again to FIGS. 8 and 9, if the vacuum servo apparatus generates the output $c_1$ under the maximum biasing state, (that is with the atmospheric valve 624 being opened as a result of the solenoid coil 640 being fed with current, with the pressure in the pressure variation chamber reaching the atmospheric pressure), and the input amount applied to the input rod 644 is decreased for restoring the operation of the vacuum servo apparatus to the initial state, that is to the non-operating state, the vacuum servo apparatus keeps its maximum biasing state and continues to generate a high output $c_2$, even if the input f is decreased to a value $f_2$. The current supply to the solenoid coil 640 is interrupted by detection means, not shown, detecting that the output and the input have reached $c_2$, $f_2$, respectively, so that the solenoid plunger 630 and the atmospheric element 632 are moved towards the input side under the bias of the coil spring 638. The atmospheric valve element 632 is abutted against the valve element 660 for interrupting communication between the variable pressure chamber and atmosphere. In addition, the valve seat 660 is thrust by the atmospheric valve element 632 for displacing the valve seat 660 from the negative pressure element 623, the variable pressure chamber being then in communication with the constant pressure chamber to decrease the pressure difference between the variable pressure chamber and the constant pressure chamber. Thus the power piston 622 starts to be reverted to its initial position for decreasing the output of the negative pressure servo apparatus.

That is, contrary to the intention of decreasing the output of the negative pressure servo apparatus on the part of the driver, the negative pressure servo apparatus continues to develop a high output, even if the input applied to the input rod 644 is decreased, and the output starts to be decreased only when the input $f_2$ is reached, thus giving rise to an inconsistent feeling that the output amount might be larger than the input amount.

On the other hand, if the solenoid coil 640 is excited for opening the atmospheric valve 624 for forcibly actuating the servo apparatus for increasing the output, in addition to the usual brake application, the maximum biasing force of the servo apparatus is generated with the conventional negative pressure servo apparatus, even though it is functionally not necessary to generate the maximum biasing force of the servo apparatus. Thus, a vacuum servo apparatus capable of supplementing an appropriate biasing force has been desired.

OBJECTS OF THE INVENTION

In view of the above problems of the prior art, it is an object of the present invention to provide a vacuum servo apparatus designed to reflect the intention of the operator straightforwardly.

It is another object of the present invention to provide a vacuum servo apparatus in which the difference between normal braking and emergency braking by the driver is small and a smooth braking biasing force may be supplemented.

Further objects of the present invention will become apparent in the entire disclosure.

SUMMARY OF THE VARIOUS ASPECTS OF THE INVENTION

First Aspect

The present invention (according to a first aspect) may be summarized as follows:

In the vacuum servo apparatus of the present invention, the transmission member and the plunger member have limiting portions coming in operation when the plunger member is moved by the solenoid towards an output side by a first pre-set value relative to the transmission member for limiting relative movement of the plunger member in a value not exceeding the first pre-set value relative to the transmission member.

As a general construction, the vacuum servo apparatus comprises following features:

a housing defining therein a pressure chamber, a movable wall movably mounted in said housing and dividing said pressure chamber into a constant pressure chamber and a variable pressure chamber, a power piston having an outer end opening and connected to said movable wall, an input member provided in said power piston, the input member being movable on brake actuation in a direction substantially along an input/output axis of said apparatus and extending to outside of said power piston, a transmission member mounted for axial movement in said power piston and connected to said input member, a plunger member provided in said power piston and axially movable by movement of said transmission member, an atmosphere-controlling seal valve formed with said plunger member, a negative pressure controlling seal valve formed in an inner surface of said power piston, a control valve biased by first biasing means towards the atmosphere-controlling seal valve and said negative pressure controlling seal valve and having a seal for being engagement with and being out of engagement with said atmosphere-controlling seal valve and said negative pressure controlling seal valve, second biasing means for biasing said input member to make said atmosphere-controlling seal valve contact said seal and actuate said seal away from said negative pressure controlling seal valve in the normal condition, third biasing means interposed between said plunger member and said transmission member for biasing said plunger member towards said seal, a reaction member for applying to said transmission member a reactive force corresponding to the force of propulsion generated in said movable wall by a pressure difference between said constant pressure chamber and said variable pressure chamber, an output member for outputting, via said reaction member, the force of propulsion of said power piston accompanying the movement of said movable wall to outside the apparatus, and a solenoid for moving said plunger member substantially along said input/output axis.

Typically, the vacuum servo apparatus according to the present invention includes: a movable wall movably mounted in a housing and dividing the housing into a constant (generally, first type) pressure chamber and a variable (generally, second type) pressure chamber, a power piston connected to said movable wall, an input rod (input member) extending from an outer end opening of the power piston to outside of the power piston and movable on brake actuation in a direction substantially along an input/output shaft, a transmission member mounted for axial movement in the power piston and connected to the input rod, a plunger member axially movable by movement of the transmission member, an (,e.g., substantially annular) atmosphere-controlling seal valve formed integrally with an input side end of the plunger member, an (e.g., substantially annular) negative pressure controlling seal valve formed in an inner surface of the power piston for extending towards an input side, and a control valve having at one end an annular seal biased by second biasing means towards the atmosphere-controlling seal valve and the negative pressure control valve for being contacted with and detached from the atmosphere-control seal valve and the negative pressure controlling seal valve. The seal valve is hermetically secured at the other end to the inner surface of the power piston and has a flexible portion at its mid portion. The vacuum servo apparatus also includes first biasing means for biasing the control valve and the input rod for abutting, during non-operative time, the atmosphere controlling seal valve onto the seal and for separating the seal from the negative pressure controlling seal valve, third biasing means interposed between the plunger member and the transmission member for biasing the plunger member towards the seal, a reaction disc for applying to the transmission member a reactive force corresponding to the force of propulsion generated in the movable wall by a pressure difference between the constant pressure chamber and the variable pressure chamber, an output rod for outputting, via the reaction disc, the force of propulsion of the power piston accompanying the movement of the movable wall to outside the apparatus, and a solenoid connected to a power source and supplied with power for moving the plunger substantially along the input/output shaft. If the solenoid is not energized, a first operating line is followed in an operating diagram having an input and an output as two coordinate axes.

Second Aspect

The first aspect provides a basis for the second aspect.

That is, if the limiting portions come in operation, the locus of the output of the vacuum servo apparatus versus the input follows a second operating line in the operational diagram.

Third Aspect

Preferably (according to a 3rd aspect), the limiting portions are abutment surfaces provided on the transmission member and the plunger member, and the controlling portions are separated in an non-operating state from each other by the first pre-set value and abutted against each other when the plunger member is moved towards an output side by the solenoid. There is provided with an allowing mechanism, operating when the transmission member is biased by the reaction disc towards the input side, for allowing relative movement of the transmission member towards the input side with respect to the power piston by a second pre-set value. The allowing mechanism comprises a clearance between a surface of an output side end of the transmission member facing the input side and a surface facing an output side of a portion holding an output side end of the transmission member, these surfaces being spaced by a second pre-set value in a non-operating state.

Fourth Aspect

Preferably (4th aspect), output/input ratios in the first and second operating lines become different by the first preset value being changed responsive to changes in an input load.

Fifth Aspect

Preferably (5th aspect), the first pre-set value is increased with an increased input load.

Sixth Aspect

Preferably (6th aspect), at least one elastic member is included among components of the transmission member for varying the first pre-set value.

Seventh Aspect

Preferably (7th aspect), the transmission member has an input receiving member engaged with an output side distal end of the input rod and a first transmission element connected to the first input receiving member and having a recess. An elastic member is accommodated in the recess in the first transmission element, an input side end face of the elastic member faces an output side end face of the input receiving member and an output side end face thereof faces the bottom of the recess of the first transmission element. A clearance is set between the abutting surface which is the input side distal end of the input receiving member and the abutment surface which is the inner peripheral flange at the input side distal end of the plunger member. The clearance has the first pre-set value in a non-operating state.

Although the present invention is not limited to illustrative embodiments, the first preset clearance and the second preset clearance correspond to the clearances A and $C_2$ in the embodiments.

Similarly, in the embodiment, the operational line in the embodiment is shown in FIG. 4, in which the first operational line is an operational line a, while the second operational line is an operational line b. In the forward stroke, it is a line segment on the operational line b extending from an operating point $b_1$ to a saturation bias point S on the operational line b. The operating point $b_1$ is at a position below a dead point. In other words, the output of the servo mechanism of the vacuum servo apparatus is not saturated at the operational point $b_1$.

Referring to a stroke passing through the second operational line (forward stroke), if an input up to $f_1$ is given during the normal operation, an output passes through a line a and is at an operating point $a_1$. In case where the input $f_1$ is maintained and the solenoid is energized, an output reaches $b_1$ by additional jump. Then, if the input is increased further, the output shifts from $b_1$ tracing a chain line to reach the saturation bias point S. As from the dead point, the output follows a line in which the output is increased merely corresponding to the increase in the input. As for the return stroke, the second operational line is followed in the opposite direction.

Operation

The operation of the vacuum servo apparatus according to the present invention will be explained. In the following description, the output side and the input side denote the forward and backward sides of the housing, respectively.

First, the operation of the present invention is briefly explained.

The vacuum servo apparatus according to the present invention is such an apparatus provided with a mechanism for energizing a solenoid in the apparatus when the driving or braking conditions besides the input conditions by the vehicle driver, such as the speed of braking pedal actuation by the driver, exceeds a threshold value, such as during rapid brake application, for supplementing an output additional to the biasing force produced by the input. The biasing force to be supplemented and generated is properly set so that an output of the vacuum servo apparatus will be decreased quickly for prompting the output decrease of the apparatus during the return stroke for straightforwardly reflecting the intention of the driver.

With the vacuum servo apparatus according to the fourth aspect of the present invention, if an additional biasing force is to be developed by, for example, energizing the solenoid, a small increase in the biasing force suffices for the low brake pedal pressure value range. For a higher brake pedal pressure range, a larger increase in the biasing pressure is applied than that for the low pedal pressure range for reducing the difference from the normal braking value by the driver for supplementing smooth brake biasing force.

In the following, the operation of the various aspects of the present invention will be explained in detail.

If the driver presses the brake pedal abruptly, e.g., detection means for detecting the pedal operating speed senses this abrupt brake pedal pressing and the solenoid is energized responsive to this detection, the plunger member is moved in an amount corresponding to the movement of the transmission member, as a result of axial movement of the transmission member towards the output side caused by brake application. Since the solenoid is additionally energized, the plunger member is moved further axially towards the output until the axial movement of the plunger member towards the output side is limited by abutment of an abutment portion of the plunger member on an abutment portion of the transmission member.

With movement of the transmission member and the plunger member, the seal of the control valve is contacted with the negative pressure controlling seal valve of the power piston for cutting off the communication between the constant pressure chamber and the variable pressure chamber. Thereupon the atmosphere control seal valve is separated away from the seal to permit atmospheric air to flow into the variable pressure chamber to raise the pressure therein. The pressure difference between the pressure in the variable pressure chamber and that in the constant pressure chamber generates a force of propulsion for moving the movable wall and the power piston axially towards the output side. This force of propulsion is taken out by the output rod via the reaction disc to outside of the housing.

The reaction disc is elastically deformed by the thrusting force from the power piston so as to be expanded towards the input side (the surface of the output side end facing an output side in the 3rd aspect) into abutment against the forward distal end face of the transmission member for applying a reactive force on the transmission member (and the input rod). Since the transmission member is thrust back axially towards the input side, the abutment of the transmission member is abutted against the abutment portion of the plunger member, and the reactive force applied by the reaction disc is larger than the force of axial bias applied by the energized solenoid to the plunger member, the plunger member also is moved axially towards the input side, and the atmosphere control seal is abutted against the seal for cutting off the communication between the variable pressure chamber and atmosphere.

Thus the reactive force applied to the reaction disc reaches an equilibrium with the input applied to the transmission member. The amount of expansion of the reaction disc corresponds to the amount of movement of the abutment portion of the plunger member as far as the abutment portion of the transmission member.

If, in this equilibrium state, a further biasing force is entered to the transmission member towards the output side, the transmission member overcomes the reactive force of the reaction disc so as to be moved axially towards the output side. The plunger member is moved by an amount corresponding to the movement of the transmission member. By movement of the plunger member, the atmosphere controlling seal valve is displaced away from the seal of the control valve to permit atmospheric air to be intruded into the variable pressure chamber to raise the pressure therein. The pressure difference between the pressure in the variable pressure chamber and that in the constant pressure chamber generates a force of propulsion for moving the movable wall and the power piston axially towards the output side. This force of propulsion is taken out by the output rod via the reaction disc to outside of the housing.

The reaction disc is elastically deformed by the thrusting force from the power piston so as to be expanded towards the input side (the surface of the output side end facing an output side in 2nd aspect) into abutment against the forward distal end face of the transmission member for applying a reactive force on the transmission member (and the input rod). Since the transmission member is thrust back axially towards the input side, the abutment portion of the transmission member is abutted against the abutment portion of the plunger member, so that the plunger member also is moved axially towards the input side to break the communication between the variable pressure chamber and atmosphere. Thus the reactive force reaches an equilibrium with the input supplied to the transmission member.

When an input is further applied to the input rod (transmission member) in this equilibrium state, atmospheric air is again introduced into the variable pressure chamber for raising the biasing force.

When the atmospheric air (i.e., base or primary pressure) is fully introduced into the variable pressure chamber and the biasing force outputted by the vacuum servo apparatus is saturated, a further input to the input rod and the transmission member is taken out by the output rod via the reaction disc. Thus in this state, the output of the vacuum servo apparatus is substantially equal to the input further applied to the input member (input rod).

The return stroke is now explained. When the brake pedal is replaced and the input amount to the input rod and the transmission member is decreased, the transmission member is moved axially towards the input side. Since the output rod and the reaction disc are also moved axially towards the input side, the output is decreased. The output decrease during this time period is equal to the input decrease at the input member.

If the input applied to the input load is decreased further, the transmission member is moved axially towards the input side. With such axial movement of the transmission member, the plunger member is also moved, with the atmosphere controlling seal valve being abutted against the seal for cutting off the communication of the variable pressure chamber with atmosphere. With further axial movement of the transmission member and the plunger member towards the inlet side, the seal is separated away from the negative pressure controlling seal valve for establishing communication between the constant pressure chamber and the variable pressure chamber. Since this decreases the pressure difference between the constant pressure chamber and the variable pressure chamber, the movable wall and the power piston are moved towards the input side. By this movement of the power piston, the output rod and the reaction disc are also moved axially towards the input side, so that the output is deceased. The output decrease during this time period is equal to the decrease in the biasing force applied by the biasing mechanism of the vacuum servo apparatus.

If the input or the output amounts are judged by detection means to have reached a pre-set value, current supply to the solenoid is interrupted so that the plunger member is biased axially by third biasing means towards the input side and thereby moved axially towards the input side. With further decrease in the input towards the input member (input rod), the input rod and the transmission member are biased by the second biasing means axially towards the input side and thereby moved axially towards the input side. The vacuum servo apparatus is reset to its initial position, that is to the non-operating state.

The first and second pre-set values are set so that the "limiting portions" and the "allowing portion" will display the functions described in the 1st to 3rd aspects.

If the solenoid operates on the plunger member, as when the brake pedal is actuated abruptly, the loci of movement of the (input and output) of the vacuum servo apparatus pass through the second operational line in the operational diagram having the input and the output as the two coordinate axes, as discussed in "Summary of the Various Aspects of the Invention".

If the solenoid does not act on the plunger member, as during normal brake application, the loci of movement of the (input and output) of the vacuum servo apparatus pass through the first operational line, as discussed in "Summary of the Various Aspects of the Invention".

The difference between the outputs of the two operational lines corresponds to the additional jump amount.

As the operation of the vacuum servo apparatus according to the 4th aspect, if the driver presses the brake pedal abruptly, detection means for detecting the pedal operating speed senses this abrupt brake pedal pressing and the solenoid is energized responsive to this detection, the plunger member is moved in an amount corresponding to the movement of the transmission member, as a result of an axial movement of the transmission member towards the output side caused by the brake application. Since the solenoid is additionally energized, the plunger member is moved further axially towards the output until the axial movement of the plunger member towards the output side is limited by abutment of an abutment of the plunger member on the abutment portion of the transmission member. The distance of movement required for the abutment portion of the plunger member becoming abutted against the abutment portion of the transmission member is changed with the input load. Explanation of the subsequent operation is omitted since it is similar to that of the above-described vacuum servo apparatus.

Thus, in the vacuum servo apparatus of the 1st to 3rd aspects, the additional jump amount is substantially the same even if the input amount is changed. However, with the vacuum servo apparatus of the 4th aspect, the additional jump amount is varied with the input amount.

The operation of the vacuum servo apparatus according to the 5th aspect is as follows: If the driver actuates the brake pedal suddenly, detection means for detecting the brake pedal actuating speed, for example, detects this sudden brake pedal application, and the solenoid is energized by such detection, the plunger member is also moved axially towards the output side by solenoid energization. The abutment portion of the plunger member is abutted against the abutment portion of the transmission member for limiting axial movement of the plunger member towards the output side. The distance of movement required for the abutment portion of the plunger member being abutted against the abutment portion of the transmission member is increased with increased input load. The subsequent operation is similar to that of the above-described vacuum servo apparatus and hence the description thereof is omitted for brevity.

Thus, in the vacuum servo apparatus of the 1st to 3rd aspects, the additional jump amount is substantially the same even if the input amount is changed. However, with the vacuum servo apparatus of the 5th aspect, the additional jump amount is increased with the input amount.

The operation of the vacuum servo apparatus according to the 6th aspect is as follows: If the driver actuates the brake pedal suddenly, detection means for detecting the brake pedal actuating speed, for example, detects this sudden brake pedal application, and the solenoid is energized by such detection, the plunger member is moved axially by a movement amount of the transmission member towards the output caused by brake application. In addition, with solenoid energization, the plunger member is further moved axially towards the output side so that the abutment portion of the plunger member is caused to bear against the abutment of the transmission member for limiting axial movement of the plunger member towards the output side. The distance of movement required for the abutment portion of the plunger member being abutted against the abutment portion of the transmission member is increased with deformation of the elastic member corresponding to the pressed amount of the brake pedal. The subsequent operation is similar to that of the above-described vacuum servo apparatus and hence is omitted. Thus, in the vacuum servo apparatus of 1st to 3rd aspects, the additional jump amount is substantially the same even if the input amount is changed. However, with the vacuum servo apparatus of the 6th aspect, the additional jump amount is varied with the input amount.

The operation of the vacuum servo apparatus according to 7th aspect is as follows: If the driver actuates the brake pedal suddenly, detection means for detecting the brake pedal actuating speed, for example, detects this sudden brake pedal application, and the solenoid is energized by such detection, the input receiving member, as one of the components of the transmission member, is moved axially towards the output by brake application, as the elastic member is deformed. The input receiving member thrusts an element of the transmission member (such as the first transmission element in the embodiment) via the elastic member for axially moving the first transmission element and hence the transmission member towards the output side. By axial movement of the transmission member towards the output side, the plunger member is also moved in an amount corresponding to the movement of the transmission member. In addition, with solenoid energization, the plunger member is further moved axially towards the output side so that the abutment of the plunger member is caused to bear against the abutment of the transmission member for limiting axial movement of the plunger member towards the output side. The distance of movement required for the abutment portion of the plunger member being abutted against the abutment portion of the transmission member is increased as the input load increases, i.e., due to deformation of an elastic member according to the pressed amount of the brake pedal. The subsequent operation is similar to that of the above-described vacuum servo apparatus and hence is omitted in description. Thus, in the vacuum servo apparatus of the 1st to 3rd aspects, the additional jump amount is substantially the same even if the input amount is changed. However, with the vacuum servo apparatus of the 7th aspect, the additional jump amount is varied with the input amount.

Meritorious Effects of the Invention will be summarized as follows:

According to the present invention, as described above, there is provided such a vacuum servo apparatus in which, if, responsive to driving or brake applying conditions, in addition to the input conditions by the vehicle driver, the speed of brake pedal actuation by the driver exceeds a threshold value, e.g., during emergency brake application, a solenoid provided in the servo apparatus is energized for supplementing an output other than the biasing force by the input. The biasing force to be supplemented is appropriately set so that an output of the vacuum servo apparatus is decreased rapidly responsive to the decreased input of the pedal actuation during the return stroke for straightly reflecting the intention of the actuator.

With the constitution of the 4th to 7th aspects, since the first pre-set value is varied responsive to changes in an input load, that is by variation of the tilt of the operating line before and after additional jump, the difference between the normal braking and emergency braking is decreased and a smooth braking biasing supplementary force may be produced.

With the constitution of the 7th aspect, the elastic member is provided for performing the role of hermetic sealing between elements constituting the transmission member (i.e., between the input rod (input receiving element) and the first transmission element). It is noted that, if the transmission member is split and the input receiving element is provided, it becomes necessary to provide such hermetic seal between the input rod (input receiving element) and the first transmission element.

DESCRIPTION OF THE PREFERRED EMBODIMENTS

Figure 1:
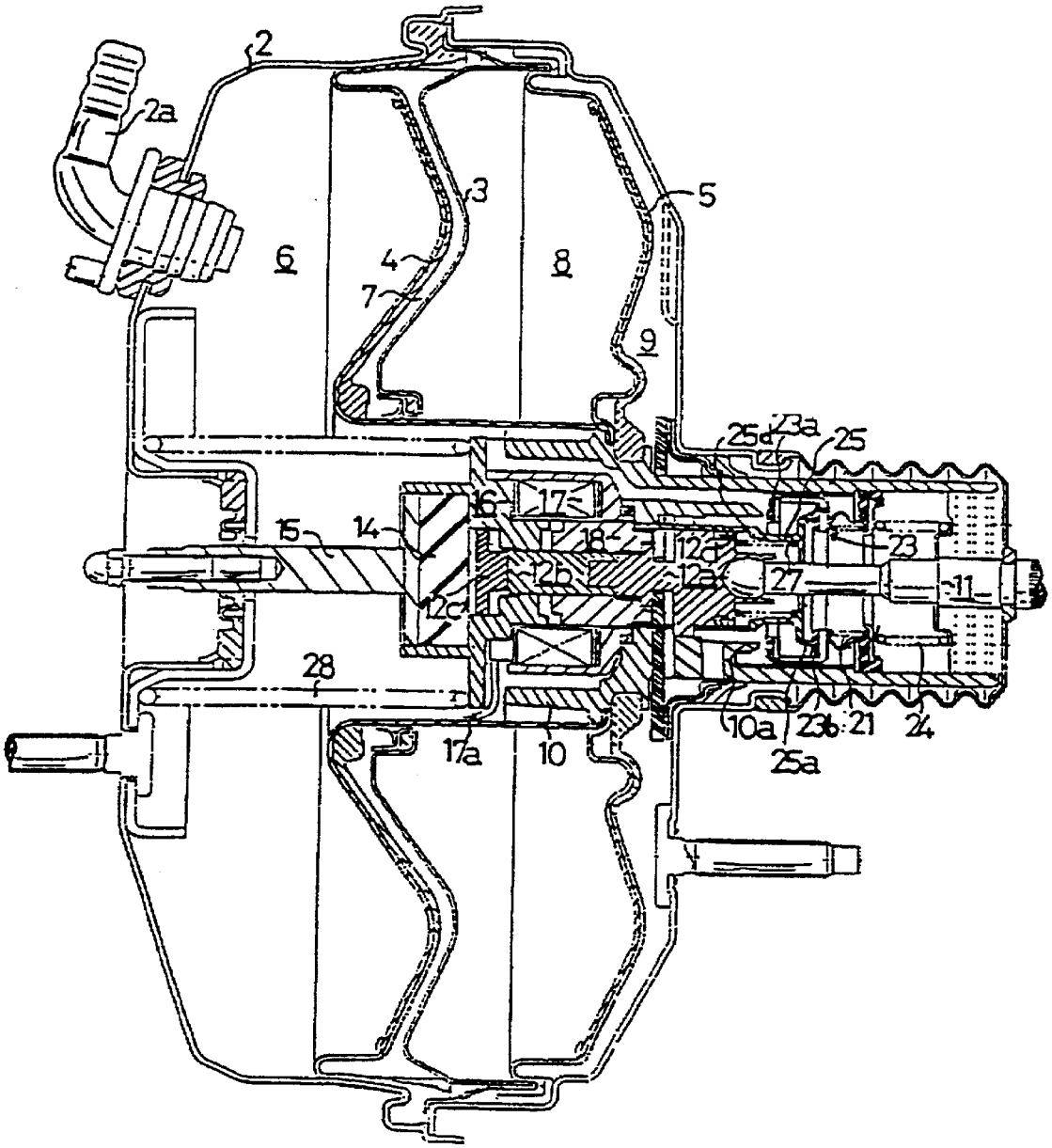
FIG. 1 is a cross-sectional view taken along the input/output axis of a vacuum servo apparatus according to an embodiment of the present invention.

Referring to the drawings, preferred embodiments of the present invention will be explained in detail. In the following description, the forward portion and the forward end mean the direction of the output side of the vacuum servo apparatus, while the rear portion and the rear end mean the direction of the input side thereof. The input/output shaft means the input/output shaft of the negative pressure servo apparatus, and the center axis is parallel to the input/output shaft. The radial direction means a direction perpendicular to the input/output shaft of the vacuum servo apparatus.

First Embodiment

Figure 2:
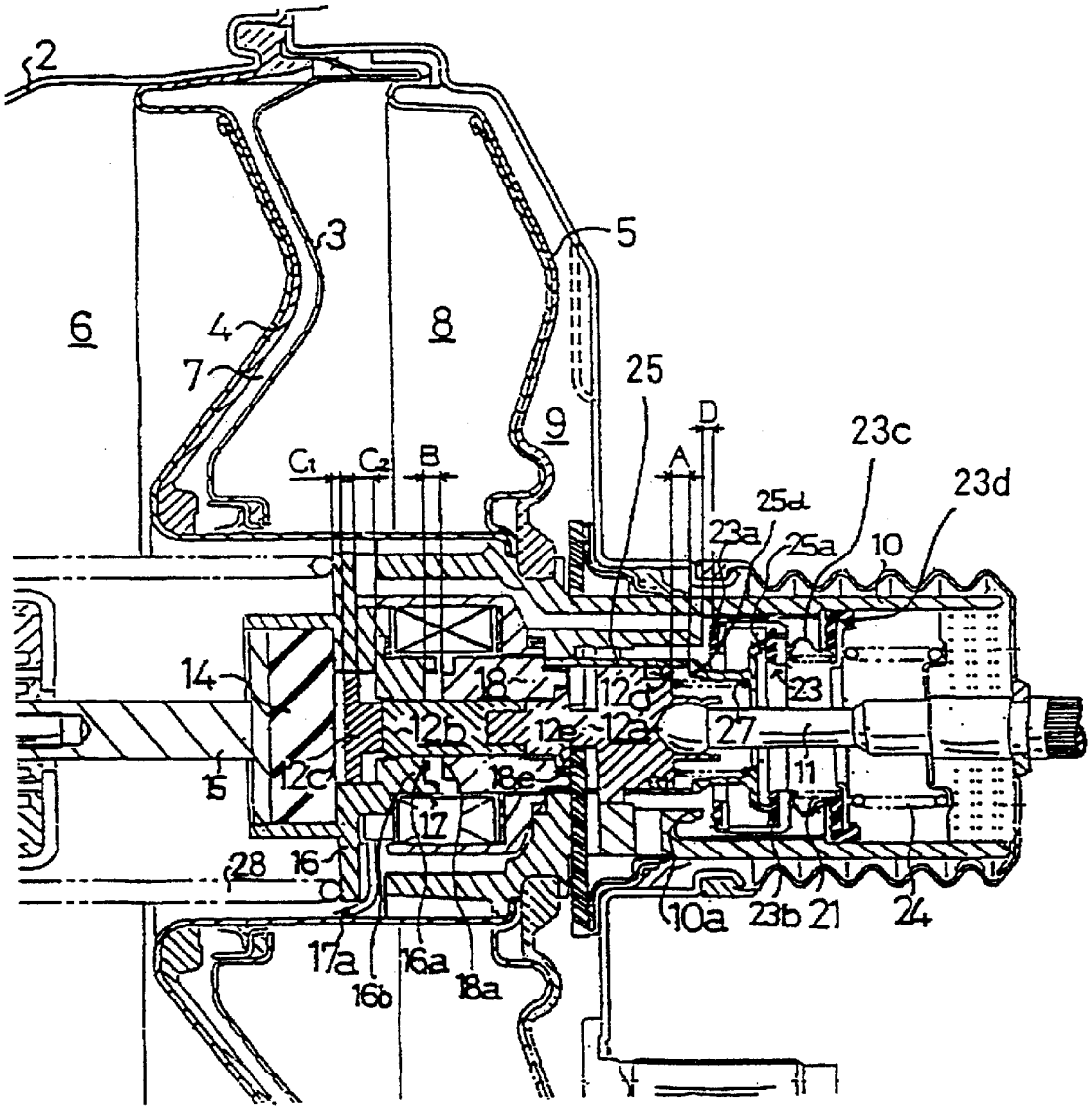
FIG. 2 is an enlarged view showing essential portions of FIG. 1 showing the embodiment of the present invention.
Figure 3:
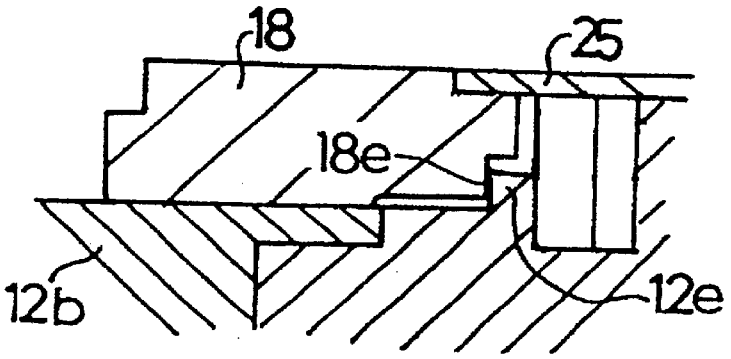
FIG. 3 is a partial enlarged view of FIG. 1 showing the embodiment/of the present invention.
Figure 4:
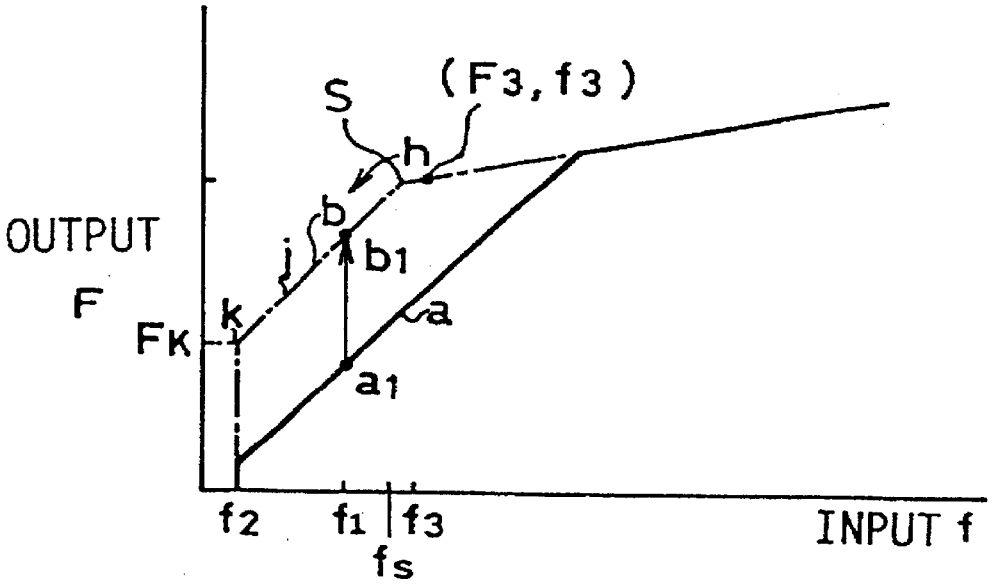
FIG. 4 is a graph showing the performance of a vacuum servo apparatus according to an embodiment of the present invention.

FIG. 1 is a cross-sectional view, taken along the direction of the input/output shaft of a vacuum servo apparatus according to an embodiment of the present invention. FIG. 2 illustrates essential portions of FIG. 1 to an enlarged scale. FIG. 3 illustrates a part of FIG. 1 to an enlarged scale. FIG. 4 is a graph showing the performance of the vacuum servo apparatus according to an embodiment of the present invention. Referring to. FIG. 1, a vacuum servo apparatus of the present embodiment is applied to a brake booster for a vehicle. The vacuum servo has a protuberant portion on its input side communicating with atmosphere and also has a substantially conically-shaped housing 2 on its outlet side having an inlet 2a communicating with an intake manifold of an engine, not shown. To the end face of the protuberant portion of the housing 2 is connected a tube in the shape of bellows which may be moved substantially along the input/output shaft and the input rod 11 connected to a brake pedal, not shown, actuated by the driver. Within the housing 2 and the tube in the shape of bellows, a power piston 10 formed as a double tube having a fluid passage is inserted, and a movable rear wall 5, a fixed wall 3 and a movable front wall 4, all formed substantially in a shape of diaphragm, are accommodated.

The rear wall of the housing 2 and the movable rear wall 5 delimit a rear variable pressure chamber 9, while sidewall portions of the rear movable wall 5, fixed wall 3 and the housing 2 delimit a rear constant pressure chamber 8. The fixed wall 3 and the movable front wall 4 delimit a front variable pressure chamber 7, while the movable front wall 4 and the sidewall and front wall portions of the housing 2 delimit a front constant pressure chamber 6.

The outer peripheral part of the movable rear wall 5 is supported by the housing 2 for maintaining air-tightness of the rear variable pressure chamber 9 and the rear constant pressure chamber 8. The movable rear wall 5 is moved toward the output side substantially along the input/output shaft by atmosphere flowing into the rear variable pressure chamber 9 and negative pressure of the rear constant pressure chamber 8. By this movement, the power piston 10 is moved, substantially along the input/output shaft (stroke movement).

The outer peripheral portion of the movable front wall 4 is supported for maintaining air-tightness of the front variable pressure chamber 7 and the front constant pressure chamber 6. The movable front wall 4 is moved substantially along the input/output shaft, by atomosphere air flowing into the front variable pressure chamber 7 and under an negative pressure in the front constant pressure chamber 6. By this movement, the power piston 10 is moved towards the outlet side, substantially along the input/output shaft (stroke movement).

The rear variable pressure chamber 9 and the front variable pressure chamber 7, making up a set of variable pressure chambers, perpetually communicate with each other, while selectively communicating with or becoming interrupted from atmosphere by an atmospheric control seal 23b being spaced apart from or contacted with an atmospheric control seal 25a provided on the input side end of a second plunger member 25. The rear constant pressure chamber 8 and the front constant pressure chamber 6, making up a set of constant pressure chambers, perpetually communicate with each other. The variable pressure chambers 9, 7 and the constant pressure chambers 8, 6 selectively communicate with or are disconnected from each other by a negative pressure control seal 23a being spaced apart from or contacted with an negative pressure control seal valve 10a formed on the inner surface of the power piston 10 for being protruded towards the inlet side.

The rear constant pressure chamber 8 and the front constant pressure chamber 6 communicate via an inlet 2a with an engine intake manifold, not shown, operating as an negative pressure source, and are perpetually at an negative pressure.

Within the housing 2, the input rod 11 is inserted and valve elements, for example, are accommodated within the substantially tubular-shaped power piston 10 with an increased diameter at the output side, extending along the input/output shaft from the protuberant end of the housing 2.

The inner peripheral ends of the movable rear wall 5 and the movable front wall 4 are supported in this order on the outer periphery of the power piston 10 from the input side towards the output side of the negative pressure servo apparatus 1 for maintaining air-tightness of the variable pressure chambers 9, 7 and the constant pressure chambers 8, 6.

The inner peripheral end of the fixed wall 3 is abutted against the lateral side of the movable front wall 4 for maintaining air-tightness of the rear constant pressure chamber 8 and the front variable pressure chamber 4.

The power piston 10 is moved by stroke movement substantially along the input/output shaft of the vacuum servo apparatus, as the power piston is abutted and slid via the movable front wall 4 against the inner peripheral end of the fixed wall 3. The movable rear wall 5 and the movable front wall 4 are moved by this stroke movement.

The input rod 11 is arranged at the input end of the vacuum servo apparatus. The input rod 11 has its rear end protruded out of the housing 2 so as to be connected to a brake pedal, not shown, while having its forward end introduced via an input side end face of the protruded portion of the housing 2 into the inside of the power piston 10 for extending along its center shaft.

A small-diameter portion of the power piston 10 is inserted along the inner periphery of the bellows-like tube connected to the protuberant portion of the housing 2 and which is deformed in compression with movement of the input rod 11. On the input side end portion of the input rod 11 are fitted an annular filter or a silencer substantially coaxially with the input rod 11.

On the outer periphery of the input rod 11 is arranged a retainer.

On the output side of the retainer is mounted a control valve 23 lying along the center shaft.

The control valve 23 is made up of first and second components, with the first component being made up of two members, that is the negative pressure control seal portion 23a and a back-up annular plate (bonded by curing to the seal portion). The second component is made up of four members, that is an atmosphere controlling seal member 23b, a back-up first tube having an inturned flange for integrally supporting the seal portion 23b, a second tubular member having a tubular extensible portion 23c and a rear end mounting portion 23d, and an annular plate reinforcing the rear end mounting member 23d. These four members are bonded to one another by curing. The first and second components are integrally bonded to each other by caulking the forward end of the first tubular member towards the inner peripheral portion with the first component being air-tightly fitted to a shoulder formed on the inner periphery of the forward end of the first tubular member. The control valve 23 is air-tightly secured to the inner peripheral surface of the power piston 10 with the rear end mounting member 23d.

On the inner periphery of the control valve 23 is mounted a first biasing member 21 biasing the seal portions 23a, 23b of the control valve 23 towards the sealing valves 10a, 25a. Between the annular plate reinforcing the rear end mounting member 23d and a retainer disposed at the outer periphery of the input rod 11, a second biasing member 24 biasing the input rod 11 towards the input side is interposed under compression.

The atmospheric controlling valve seal member 25a of the second plunger member 25, intruded into the inside of the first tubular member of the control valve 23 (see FIG. 2), may be enlarged radially inwardly and outwardly, while the atmosphere-controlling seal valve 25a may be intimately contacted with or spaced apart from the atmosphere-control seal portion 23b. The second plunger member 25 has its output side end connected to the first plunger member 18, and has its inner peripheral surface formed with an abutment surface 25d.

The output side of the negative pressure controlling seal portion 23a is faced by the negative pressure controlling seal valve 10a which my be abutted against or spaced apart from the seal portion 23a.

On the forward side of the output end of the input rod 11 is arranged a transmission member 12, made up of a first transmission element 12a, a second transmission element 12b and a third transmission element 12c, extending substantially along the input/output shaft.

The input side of the first transmission element 12a is formed with an abutment surface 12d facing the abutment surface 25d. A tubular portion is formed from the abutment surface 12d extending towards the input side so as to be engaged with the input rod 11 so as to surround the spherical forward end of the input rod 11.

On the inner peripheral surface Of the second plunger member 25, a third biasing member 27 is interposed under compression, with the abutment surface 12d as a supporting surface, for biasing the second plunger member 25 towards the input side. The abutment surface 25d may be abutted against or spaced apart from the abutment surface 12d.

The first transmission element 12a is formed with a protrusion (boss) 12e facing the abutment surface 25d with a stop for prohibiting excessive stroke of the transmission member 12 in-between and protruded axially outwardly for being abutted against or spaced apart from a shoulder 18e of the first shoulder member 18. Thus, with axial movement of the input rod 11 and the transmission member 12 towards the output side, the first plunger member 18 and the second plunger member 25 may also be moved axially towards the output side.

The third transmission element 12c has a disc-like portion of an enlarged diameter received within the reaction disc retainer 16, the disc-like portion facing with its input side and a bottom surface of a recess formed in the reaction disc retainer 16, while facing with its output side end the reaction disc 14.

The reaction disc retainer 16 is formed solid with the power piston 10 or formed on the power piston and is extended towards the output side. The reaction disc retainer also has a tubular portion extended from the output end face. The inner peripheral portion of the output end face of the reaction disc retainer 16 is abutted against the outer peripheral portion of the input side end face of the reaction disc 14. The reaction disc 14 is fitted in intimate contact on the inner peripheral surfaces of the tubular portion and the output side end face of the reaction disc retainer 16.

Between the outer peripheral surface of the output side end face of the reaction disc retainer 16 and a retainer contacted with the inner wall of the housing 2, a fourth biasing member 28 is interposed under compression.

On the forward side of the output side of the reaction disc 14 is mounted a substantially rivet-shaped output rod 15 for extending along the center axis. The output rod 15 has its input side end face of the planar portion intimately contacted with the reaction disc 14. A brake device, inclusive of a hydraulic system, not shown, is provided on the output side. The output rod 15 hydraulically operates on the brake device to apply a hydraulic force of reaction via the reaction disc 14 and the transmission member 12 on the input rod 11.

The output side end face of the first plunger member 18 is formed with a protrusion 18a. A recess 16a is formed facing the protrusion 18a.

On the outer peripheral surface of the first plunger member 18 and on the inner peripheral surface of the power piston 10, there is formed a solenoid coil 17.

In the construction of the present embodiment, there are formed four clearances. In FIG. 2, these clearances are shown in the nonoperative state.

Clearance D is a clearance between the negative pressure controlling seal portion 23a of the control valve 23 and the negative pressure controlling seal valve 10a.

Clearance B is a clearance between the surface of the protrusion 18a of the first plunger 18 formed on the reaction disc retainer 16 and the surface of the recess 16a facing the protrusion 18a. The clearance B serves for suction of the first and second plungers 18, 25.

Clearance A is a clearance between the abutment surface 12d of the first transmission element 12a and the abutment surface 25d of the second plunger 25. It is of a first preset value in the non-operating state. The clearance A becomes "0" on suction of the first and second plungers 18, 25, due to abutment of surfaces 12d and 25d, with the entire length of an air valve, that is a length from the foremost end of the output side of the transmission member 12 to the foremost end of the input side of the second plunger 25, being in a contracted state.

Clearance $C_1$ is a clearance between the disc-shaped large-diameter output side end face of the third transmission element 12c and the input side end face of the reaction disc 16.

Clearance $C_2$ is of a second pre-set value under the non-operating state, and is a clearance between the disc-shaped large-diameter input side end face of the third transmission element 12c and the bottom surface of a recess formed in the reaction disc retainer 16. The clearance $C_2$ is of a value to permit regression of the transmission element 12c during the return stroke or on change of jumping characteristics.

The clearances are set so that at least $C_2+D \leqq A$ and preferably $C_2>A$, with the value of $C_2$ being set so as to be significantly larger. The clearance B is preferably set so as to be larger than A or C.

The value of the clearance A determines an output "up" (increase) corresponding to deformation resistance of the reaction disc 14.

Explanation of operation

The operation of the vacuum servo apparatus of the present embodiment will be explained in the sequence of the normal operation and the operation in case of additional solenoid energization.

Normal Operation- Forward Stroke

The forward stroke proceeds with the air valve seat and the vacuum valve seat being in the seated state, that is with the atmospheric controlling sealing valve 25a being seated on the atmospheric seal portion 23b and the negative pressure controlling sealing valve 10a being seated on the negative pressure seal portion 23a, with the valves and the valve seats being repeatedly opened or closed. Thus the clearances operate so that D43 0, $A \rightarrow A$, $C_1 - C_1 \rightarrow D$ and $C_2 \rightarrow C_2+D$. The reaction disc 14 flown (idly moved) towards the input side until the input reaches $f_2$ does not arrive at the transmission element 12c and issues a slight jumping output. The clearances $C_1$-D are then annulled by the reaction disc 14 moved idly so that the operation now occurs on an operating line a with a power boosting ratio as set by the ratio of the area of the reaction disc 14 to the area of the forward end face of the transmission member 12c.

The operation during this time occurs on the first operating line.

After the saturation point of the boost power (dead point) of the servo apparatus is exceeded, an increase in output corresponds to only an increase in input, such that a line as from the dead point becomes a folded (bent) line like a polygonal edge.

During the return stroke, valve reversion occurs under a force of reaction from the output side, with the air valve seat and the vacuum valve seat being substantially in the engaged state, that is with the atmospheric controlling seal portion 25a being seated on the atmospheric controlling seal portion 23b and with the negative pressure controlling sealing valve 10a being seated on the negative pressure controlling seal portion 23a, with decrease in the input f. At this time, valve opening and closing movements occur repeatedly. After the reactive force from the output ceases, that is at the time of jumping output at the output $f_2$, the spring 24 presses down the control valve 23 via the input rod 11 and the second plunger 25. This opens the negative pressure controlling sealing valve 10a from the negative pressure controlling seal portion 23a for assuring the clearance D for completing the reversion, with the output being "0".

Operation with Subsequent Solenoid Energization

If an input is applied up to the input $f_1$ by brake application, and if it is judged that brake boosting is necessary in the course of the brake actuation, based upon a control signal, such as an emergency braking, the solenoid is energized for attracting the first plunger 18.

This alters the clearances from those prevailing under the normal operating state with the input $f_1$ as described above. That is, the clearance is changed so that $A \rightarrow$0 due to suction of the first and second plungers 18, 25 by the solenoid 17. The result is that the length from the rear end of the second plunger 25 to the forward end of the transmission element 12c is shortened by a length A. This allows air to flow from the air valve (a gap between the atmospheric controlling sealing portion 23b and the atmospheric controlling seal valve 25a) into the variable pressure chambers 9, 7 to boost the output.

If the input $f_1$ is subsequently maintained, the reaction disc 14 is flown (moved) towards the input side under the increased output. Thus the members from the transmission member 12c to the input rod 11 are pushed back so that again the atmospheric controlling sealing valve 25a and the negative pressure controlling valve 10a are substantially seated on the atmospheric pressure controlling portion 23b and on the negative pressure controlling portion 23a, respectively. That is, the air valve seat and the vacuum valve seat are substantially in the engaged state. The amount of push-back is equal to the shortened length A.

Thus the clearance states are such that $C_1-D \rightarrow C_1-D+A$ and $C_2+D \rightarrow C_2+D-A$.

That is, if the input $f_1$ is maintained after the solenoid 17 is actuated at the input $f_1$, an increased output corresponding to the amount of the movement of the reaction disc 14 corresponding to the increase A of the clearance $C_1$ corresponds to the increase in the additional jumping amount so that the output is increased on the performance diagram from the point $a_1$ to the point $b_1$. The interval between the point $a_1$ and the point $b_1$ represents the "additional jumping amount".

If the input is increased or decreased further from this state, the operation which is the same as that of the conventional servo apparatus, that is the operation according to an operating line b (second operating line) having the same gradient as the operating line a is produced.

If the input is increased further, the boost force is saturated at point S. That is, the pressure in the variable pressure chambers 7 and 9 are approximately equal to the atmospheric pressure. This indicates that the atmospheric pressure valve is opened, that is that the atmospheric controlling sealing valve 25a is spaced apart from the atmospheric seal portion 23b. The members from the input rod 11 to the transmission member 12c are unified and thrust the reaction disc 14 towards the output side for opening the atmospheric seal portion 23b. In this state, the input increase is equal to an output increase.

The return stroke is now explained, taking an example in which the operation is performed beyond the saturation boost point S.

If an input up to $f_3$ is applied, an output up to $F_3$ is developed. With decrease in input, the output is decreased only in an amount corresponding to the input decrease. Thus the reversion (return) is slow during this process.

As from the point S, as indicated by arrow h, an output is decreased at a rate corresponding to the boost ratio with respect to the input decrease, so that reversion by the output side reaction at a master cylinder, not shown, provided downstream of the vacuum servo apparatus, occurs quickly. Thus, quick reversion is achieved (i.e., point j is traversed).

That is, with the present embodiment, the input and the output can be changed in proportion to each other as in the conventional operation (i.e., as under the normal operation where the solenoid is not actuated), in contradistinction from the conventional system in which the maximum boost force continues to be maintained in case of input increase or decrease. The result is the absence of an inconsistent feeling at the time of pedal actuation and achieving quick reversion.

When terminating the return stroke, it is possible to detect that the input point $f_2$ or the jumping point k (jumping output value $F_k$) has been reached and to turn off the solenoid current in order to effectuate the same operation as that of the conventional servo apparatus to complete the reversion.

Second Embodiment

Referring to the drawings, a modified embodiment (variant) of the present invention will be explained.

Figure 5:
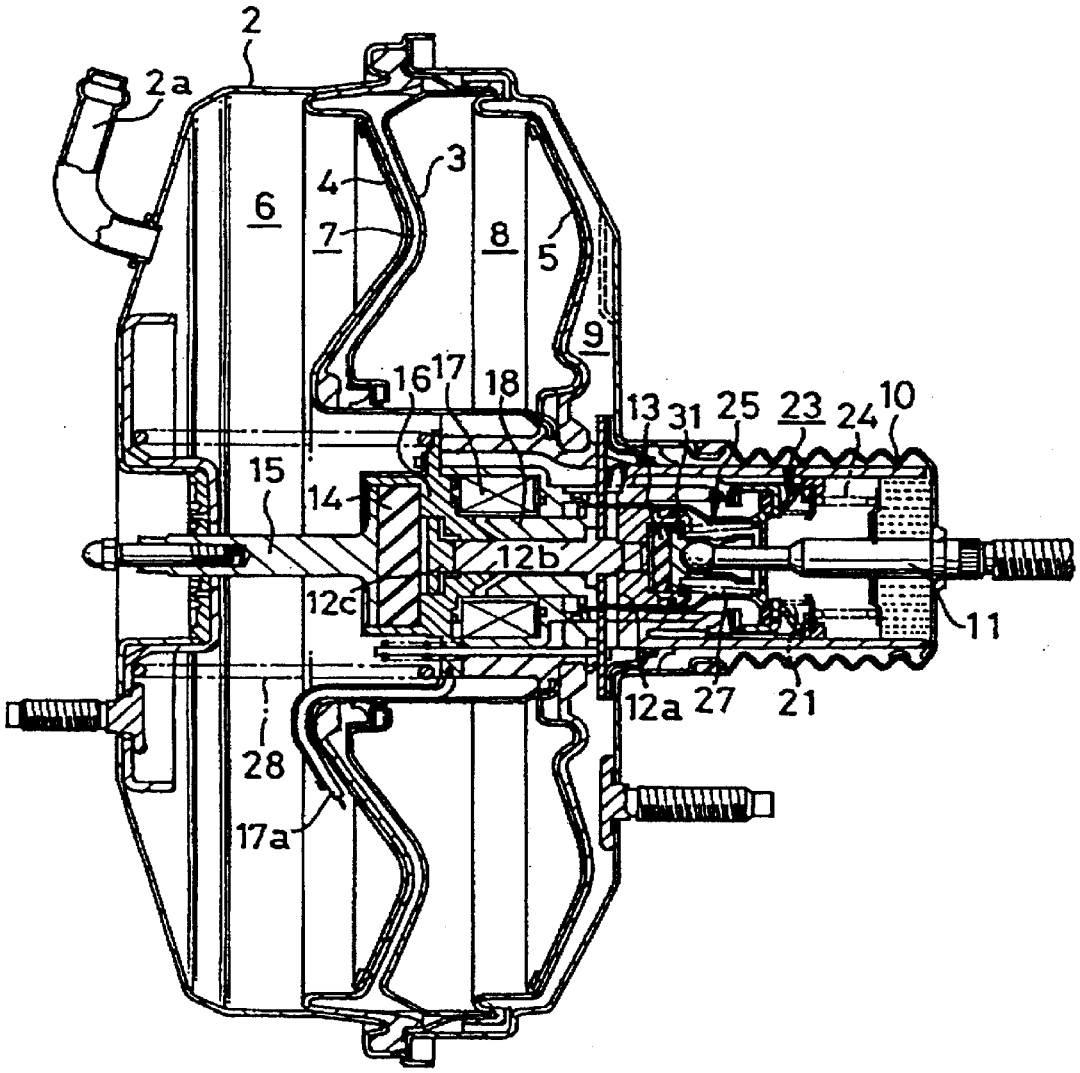
FIG. 5 is a cross-sectional view taken along the direction/along the input/output axis of a vacuum servo apparatus according to a variant embodiment of the present invention.
Figure 6:
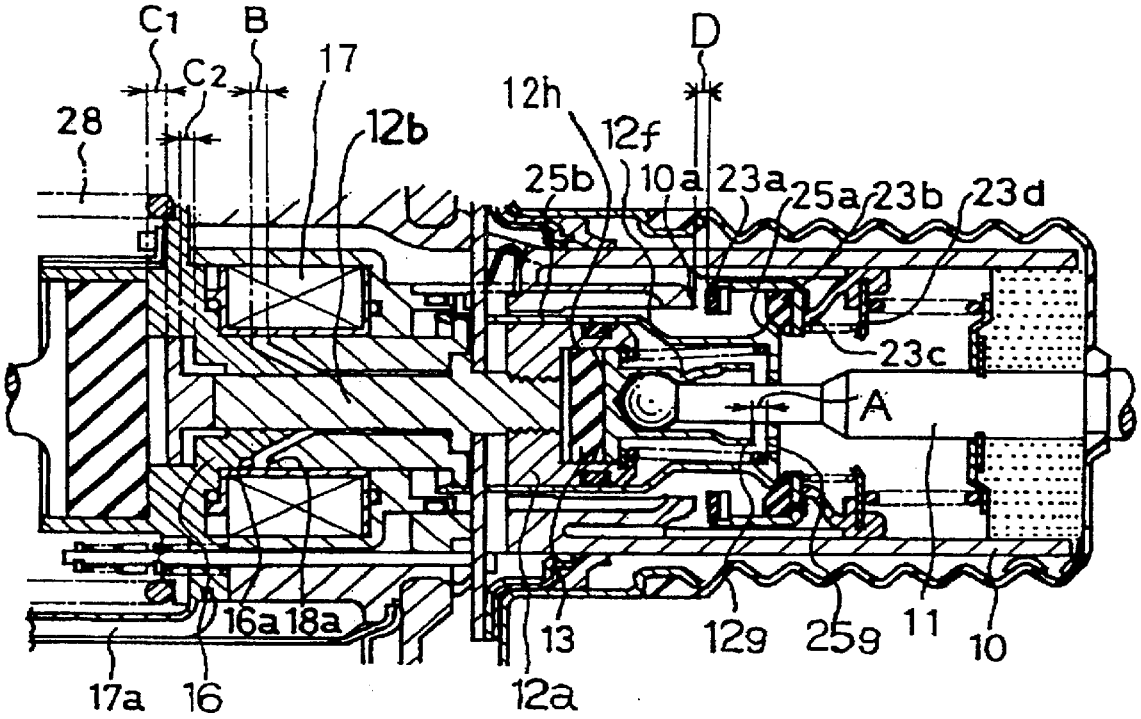
FIG. 6 shows the variant of the present invention and is an enlarged view of essential portions of FIG. 5.
Figure 7:
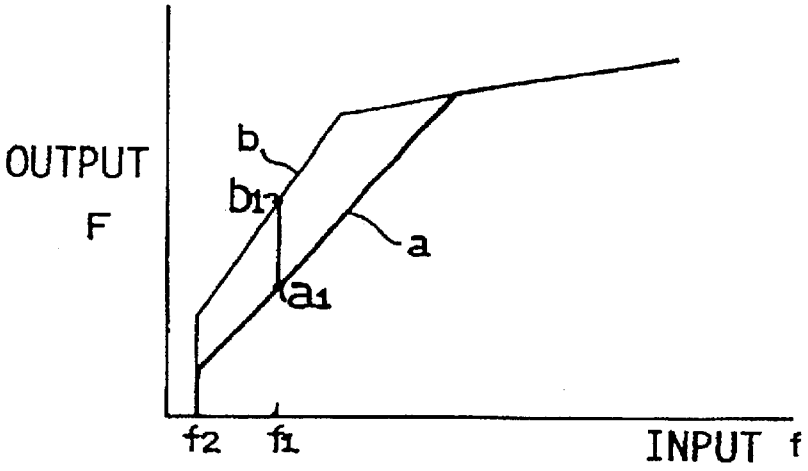
FIG. 7 is a graph showing the performance of a vacuum servo apparatus according to another embodiment of the present invention.
Figure 8:
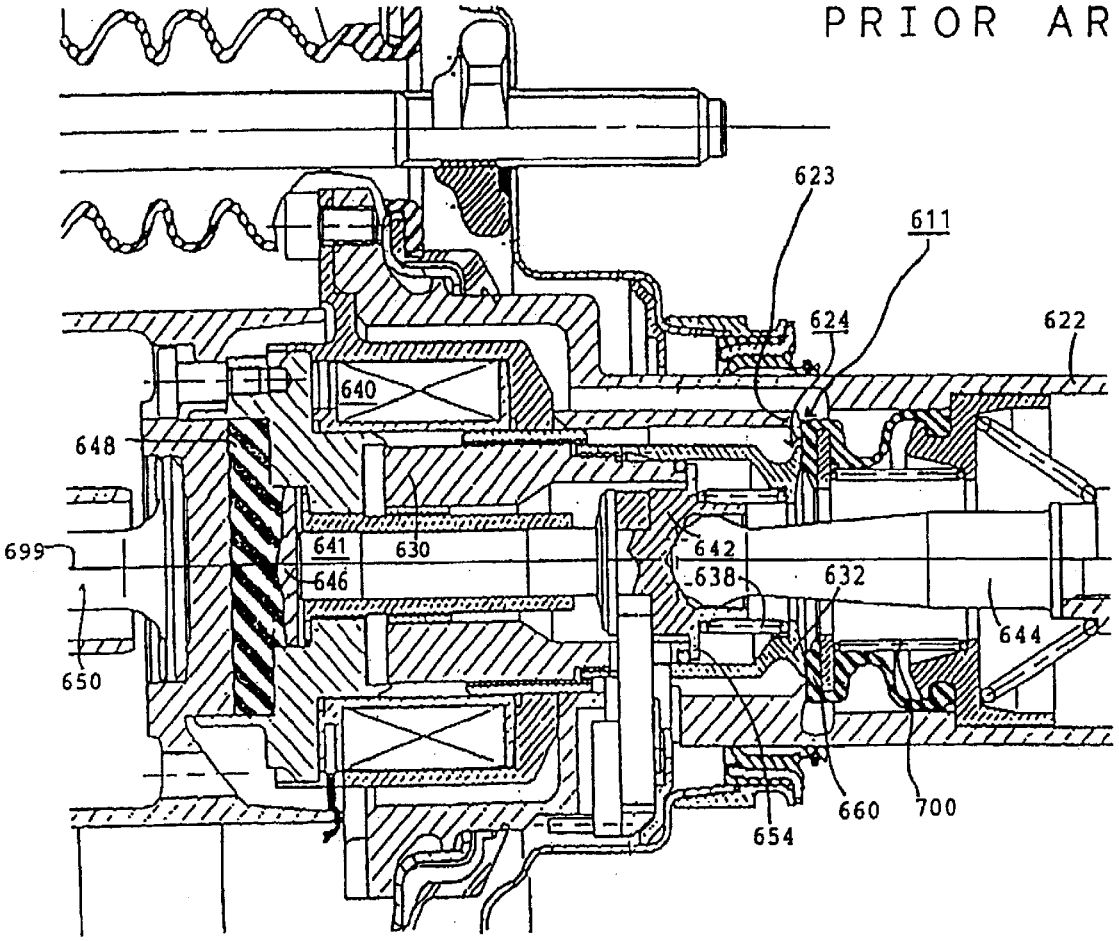
FIG. 8 PRIOR ART
FIG. 8 is a partial cross-sectional view taken along the input/output shaft of a conventional vacuum servo apparatus.
Figure 9:
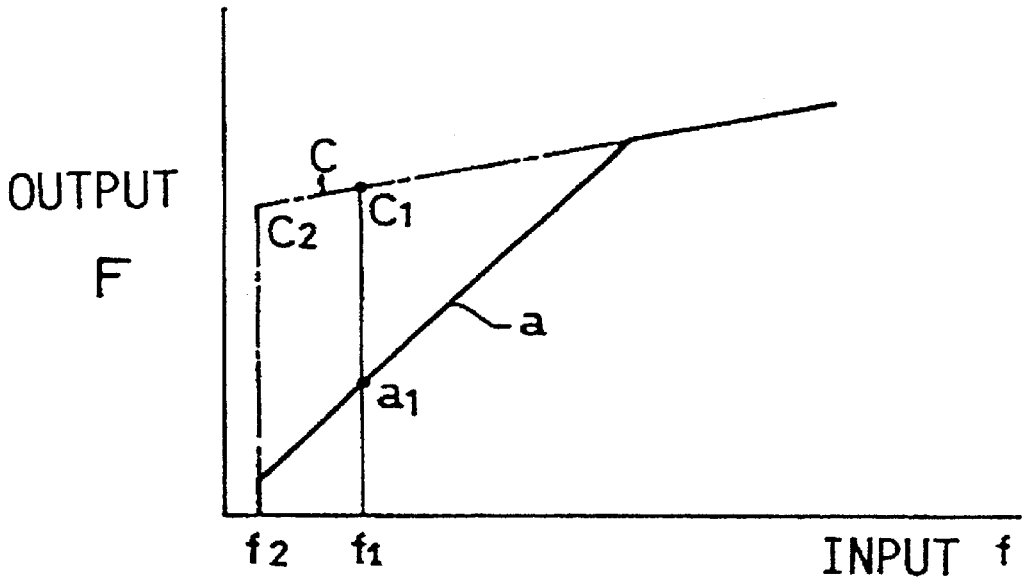
FIG. 9 PRIOR ART
FIG. 9 is a graph showing the performance of a conventional vacuum servo apparatus.

FIG. 5 is a cross-sectional view of a vacuum servo apparatus according to a variant of the present invention, taken along the input/output shaft of the vacuum servo apparatus according to the variant. FIG. 6 is an enlarged view showing essential portions of FIG. 5 and FIG. 7 is a graph showing the performance of the vacuum servo apparatus according to the viariant.

The portions of the second embodiment corresponding in structure and operation to those of the first embodiment are not explained for simplicity.

Referring to FIGS. 5 and 6, showing the vacuum servo apparatus of the instant embodiment, a first transmission element 12a having a recess 12h is arranged between an input receiving member 12f (an element of the transmission member 12) engaged with the input rod 11 for surrounding the spherical forward end of an input rod 11 and a second transmission element 12b. The first transmission element 12a is kept in contact with the outer peripheral portions of the input receiving member 12f and the second transmission element 12b.

within the recess 12h of the first transmission element 12a is accommodated an elastic member 13. The input side end face of the elastic member 13 faces the output side end face of the input receiving element 12f. The output end face of the elastic member 13 faces the bottom of the recess of the first transmission element 12a and the input side forward end face of the second transmission element 12b.

Between an abutment surface 12g, operating as the input side forward end face of the input receiving element 12f and an abutment surface 25g, which is an inner peripheral flange surface disposed at the input side forward end of a plunger member 25, there is set a clearance A. This clearance is not in operation in the illustrated state.

An abutment surface 18a is formed on the output side end face of the first plunger member 18, while another abutment surface 16a facing the abutment surface 18a of the first plunger member 18 is formed on a reaction disc retainer 16.

Referring to FIGS. 5 to 7, the operation of the present embodiment is explained.

When an input is applied to the input rod 11, that is to the input side, the elastic member 13 is deformed by being pushed by the input receiving element 12f. With the input receiving element 12f being moved towards the output side, the clearance A is enlarged. If the solenoid 17 is energized for attracting the first and second plungers 18 and 25 towards the output side, a jumping output, as set by the clearance A, is produced.

That is, if the input up to $f_1$ is applied, the output of the vacuum servo apparatus is as indicated by a point $a_1$ on an operating line a (first operating line). Thereafter, if the solenoid 17 is energized, the clearance A is increased by the input $f_1$. Depending on the magnitude of this increased clearance, an additional jumping output is produced, such that the output reaches $b_1$. The deformation of the elastic member 13 is also increased or decreased depending upon the increase or decrease of the input, as a result of which the clearance A is also increased or decreased, respectively. Such increase or decrease in clearance induces an increase or decrease of the additional jump output. If these series of operations occur continuously, an operating line b (second operating line) is produced. By increasing the input, the clearance A is increased, so that the additional jump is increased with increased input, as a result of which the output/input ratio of the operating line b (second operating line) becomes higher than the output/input ratio of the operating line a (first operating line).

Referring to FIG. 7, by changing the tilt of the two operating lines before and after additional jump, that is the operating line a and the operating line b, that is by variation of the tilt of the operating line before and after additional jump, the difference between the normal braking by the driver and the emergency braking is reduced, while a smooth braking biasing force may be supplemented.

If the transmission member is split, and the input receiving element 12f is provided, it becomes necessary to provide hermetic seal from the input rod (input receiving element 12f) towards the first transmission element 12a. However, the elastic member 13, if provided, performs the function of hermetic sealing.

The present embodiment is otherwise the same in operation as the vacuum servo apparatus of the first embodiment described hereinabove.

Although the present invention has been described with reference to preferred embodiments thereof, the present invention is not limited to these merely illustrative embodiments and covers a variety of modifications coming within the scope of the invention.

What is claimed is:

1. A vacuum servo apparatus comprising a housing defining therein a pressure chamber, a movable wall movably mounted in said housing and dividing said pressure chamber into a constant pressure and a variable pressure chamber, a power piston having an outer end opening and connected to said movable wall, an input rod provided in said power piston, the input rod being movable on brake actuation in a direction substantially along an input/output axis and extending to outside of said power piston, a transmission member mounted for axial movement in said power piston and connected to said input rod, a plunger member provided in said power piston and axially movable by movement of said transmission member, a substantially annular atmosphere-controlling seal valve formed integrally with an input side end of said plunger member, a substantially annular negative pressure controlling seal valve formed in an inner surface of the power piston and extending towards an input side, a control valve biased by first biasing means towards said atmosphere-controlling seal valve and said negative pressure controlling seal valve and having at one end thereof an annular seal for being engagement with and being out of engagement with said atmosphere-controlling seal valve and said negative pressure controlling valve, said control valve being hermetically secured at the other end to the inner surface of said power piston and having a flexible portion at a mid part thereof, second biasing means for biasing said control valve and said input rod to make said atmosphere-controlling seal valve contact said seal and actuate said seal away from said negative pressure controlling seal valve in the normal condition, third biasing means interposed between said plunger member and said transmission member for biasing said plunger member towards said seal, a reaction disc for applying to said transmission member a reactive force corresponding to the force of propulsion generated in said movable wall by a pressure difference between said constant pressure chamber and said variable pressure chamber, an output rod for outputting, via said reaction disc, the force of propulsion of said power piston accompanying the movement of said movable wall to outside the apparatus, and a solenoid connected to a power source and supplied with power for moving said plunger member substantially along said input/output axis, in which, when said solenoid is not energized, a locus of an output of said apparatus versus an input follows a first operating line in an operating diagram having an input and an output as two coordinate axes, wherein said transmission member and said plunger member have limiting portions coming in operation when said plunger member is moved by said solenoid towards an output side by a first pre-set value relative to said transmission member for limiting relative movement of said plunger member in a value not exceeding said first pre-set value relative to said transmission member, and when said limiting portions come in operation, said locus follows a second operating line in said operational diagram.

2. The vacuum servo apparatus as defined in claim 1 wherein said limiting portions are abutment surfaces provided on said transmission member and said plunger member, said limiting portions being separated in an non-operating state from each other by said first pre-set value and being abutted against each other when the plunger member is moved towards an output side by said solenoid, said vacuum servo apparatus further comprising an allowing mechanism for allowing relative movement of said transmission member towards the input side with respect to the power piston by a second pre-set value, said allowing mechanism being adapted to operate when said transmission member is biased by said reaction disc towards the input side, said allowing mechanism comprising a clearance between a surface of an output side end of said transmission member facing the input side and a surface facing an output side of a portion holding an output side end of the transmission member, said surfaces being spaced by a second pre-set value in a non-operating state.

3. The vacuum servo apparatus as defined in claim 2 wherein output/input ratios in said first and second operational lines become different by said first pre-set value being changed responsive to changes in an input load.

4. The vacuum servo apparatus as defined in claim 3 wherein said first pre-set value is increased with an increased input load.

5. The vacuum servo apparatus as defined in claim 3 wherein at least one elastic member is included among components of said transmission member for varying said first pre-set value.

6. The vacuum servo apparatus as defined in claim 5 wherein said transmission member has an input receiving member engaged with an output side distal end of said input rod and a first transmission element connected to said first input receiving member and having a recess, wherein said elastic member is accommodated in said recess in said first transmission element, an input side end face of said elastic member faces an output side end face of said input receiving member and an output side end face thereof faces the bottom of the recess of the first transmission element, and wherein a clearance is set between the abutting surface which is the input side distal end of the input receiving member and the abutment surface which is the inner peripheral flange at the input side distal end of said plunger member, said clearance having said first pre-set value in a non-operating state.

7. A vacuum servo apparatus comprising a housing defining therein a pressure chamber, a movable wall movably mounted in said housing and dividing said pressure chamber into a constant pressure chamber and a variable pressure chamber, a power piston having an outer end opening and connected to said movable wall, an input member provided in said power piston, the input member being movable on brake actuation in a direction substantially along an input/output axis of said apparatus and extending to outside of said power piston, a transmission member mounted for axial movement in said power piston and connected to said input member, a plunger member provided in said power piston and axially movable by movement of said transmission member, an atmosphere-controlling seal valve formed with said plunger member, a negative pressure controlling seal valve formed in an inner surface of said power piston, a control valve biased by first biasing means towards said atmosphere-controlling seal valve .and said negative pressure controlling seal valve and having a seal for being engagement with and being out of engagement with said atmosphere-controlling seal valve and said negative pressure controlling valve, second biasing means for biasing said input member to make said said atmosphere-controlling seal valve contact said seal and actuate said seal away from said negative pressure controlling seal valve in the normal condition, third biasing means interposed between said plunger member and said transmission member for biasing said plunger member towards said seal, a reaction member for applying to said transmission member a reactive force corresponding to the force of propulsion generated in the movable wall by a pressure difference between said constant pressure chamber and said variable pressure chamber, an output member for outputting, via said reaction member, the force of propulsion of said power piston accompanying the movement of said movable wall to outside the apparatus, and a solenoid for moving said plunger member substantially along said input/output axis, in which, when said solenoid is not energized, a locus of an output of said apparatus versus an input follows a first operating line in an operating diagram having an input and an output as two coordinate axes, wherein said transmission member and said plunger member have limiting portions coming in operation when said plunger member is moved by said solenoid towards an output side by a first pre-set value relative to said transmission member for limiting relative movement of said plunger member in a value not exceeding said first pre-set value relative to said transmission member, and when said limiting portions come in operation, said locus follows a second operating line in said operational diagram.

8. A vacuum servo apparatus comprising a housing defining therein a pressure chamber, a movable wall movably mounted in said housing and dividing said pressure chamber into a constant pressure chamber and a variable pressure chamber, a power piston having an outer end opening and connected to said movable wall, an input member provided in said power piston, the input member being movable on brake actuation in a direction substantially along an input/output axis of said apparatus and extending to outside of said power piston, a transmission member mounted for axial movement in said power piston and connected to said input member, a plunger member provided in said power piston and axially movable by movement of said transmission member, an atmosphere-controlling seal valve formed with said plunger member, a negative pressure controlling seal valve formed in an inner surface of said power piston, a control valve biased by first biasing means towards the atmosphere-controlling seal valve and the negative pressure controlling seal valve and having a seal for being engagement with, and being out of engagement with said atmosphere-controlling seal valve and said negative pressure controlling seal valve, second biasing means for biasing said input member to make said atmosphre-controlling seal valve contact said seal and actuate said seal away from said negative pressure controlling seal valve in the normal condition, third biasing means interposed between said plunger member and said transmission member for biasing said plunger member towards said seal, a reaction membmer for applying to said transmission member a reactive force corresponding to the force of propulsion generated in said movable wall by a pressure difference between said constant pressure chamber and said variable pressure chamber, an output rod for outputting, via said reaction member, the force of propulsion of said power piston accompanying the movement of said movable wall to outside said apparatus, and a solenoid for moving said plunger member substantially along said input/output axis, wherein said transmission member and the plunger member have limiting portions coming in operation when said plunger member is moved by said solenoid towards an output side by a first pre-set value relative to said transmission member for limiting relative movement of said plunger member in a value not exceeding said first pre-set value relative to said transmission member.

*9. An apparatus for use in a vehicle to boost brake pressure during a normal braking operation and an emergency braking condition, comprising:*

*an operating member for receiving an input force;*

*and an output force generator for generating an output force as a braking power;*

*said output force generator generating an output force in response to operation of the operating member during the normal braking operation in which, on an operational line diagram having said input force and said output force as two coordinates, a locus of said output force relative to said input force follows a first operational line, said output force generator generating an output force during the emergency braking condition in which the locus of said output force relative to said input force follows a second operational line on said operational line diagram that is different from said first operational line, the second operational line having a first portion defining a basic gradient in which an increase in the input force produces an equal increase in the output force; and*

*said second operational line having a second portion in which a slope is greater than said basic gradient, and the output force on the second portion of said second*

*operational line corresponding to a first input force is always greater than the output force on said first operational line corresponding to said first input force.*

*10. The apparatus as defined in claim 9, wherein said output force generator is a booster that generates said output force to assist at least said input force received by said operating member.*

*11. The apparatus as defined in claim 10, wherein said booster has a housing in which is defined a pressure chamber, and including a movable wall disposed in said housing for movement relative to said housing and dividing said pressure chamber into a constant pressure chamber communicated with a negative pressure source and a variable pressure chamber selectively communicated with said constant pressure chamber or atmosphere, a power piston connected to said movable wall, a valve mechanism for selectively establishing communication of said variable pressure chamber with said constant pressure chamber or with atmosphere in response to operation of said operating member, and an output member for outputting a propulsive power of said power piston as a result of movement of said movable wall.*

*12. The apparatus as defined in claim 9, wherein a difference between the output force on said first operational line of said operational line diagram that corresponds to a second input force and the output force on said second operational line of said operational line diagram that corresponds to said second input force is larger than a difference between the output force on said first operational line that corresponds to the first input force and the output force on said second operational line that corresponds to the first input force.*

*13. An apparatus for use in a vehicle to produce brake assisting pressure, comprising:*

*an operating member for receiving an input force;*

*a first output force generator for generating a first output force as a part of a braking power in response to operation of said operating member; and*

*a second output force generator for generating a second output force as a part of said braking power independently of operation of said operating member;*

*said first and second output force generators producing a braking force so that on an operational line diagram having said input force and said braking power as two coordinates, a locus of said braking power with respect to said input force follows a first operational line when only said first output force generator is in operation and said locus of said braking power with respect to said input force follows a second operational line when at least said second output force generator is in operation, said second operational line having a first portion defining a basic gradient in which an increase in the input force produces an equal increase in braking power, said second operational line having a second portion in which a slope is greater than said basic gradient, the braking power on the second portion of the second operational line corresponding to a first input force is always greater than the braking power on the first operational line corresponding to said first input force.*

*14. The apparatus as defined in claim 13, wherein said second output force generator adds said second output force to said first output force generated by said first output force generator, and said locus follows said second operational line when said first output force generator and said second output force generator are in operation.*

*15. The apparatus as defined in claim 14, wherein said first output force generator is a booster for generating said first output force to assist at least said input force received by said operating member.*

*16. The apparatus as defined in claim 13, wherein said second output force generator is operated in response to an emergency braking condition.*

*17. The apparatus as defined in claim 13, wherein a difference between a braking power corresponding to a second input force on said first operational line of said operational line diagram and a braking power corresponding to said second input force on said second operational line of said operational line diagram is greater than a difference between a braking power corresponding to a first input force on said first operational line and a braking power corresponding to said first input force on said second operational line.*

*18. The apparatus as defined in claim 13, wherein said first output force generator is a vacuum booster comprising a housing in which is defined a pressure chamber, a movable wall disposed in said housing for movement relative to said housing and dividing said pressure chamber into a constant pressure chamber communicated with a negative pressure source and a variable pressure chamber selectively communicated with said constant pressure chamber or atmosphere, a power piston connected to said movable wall, a valve mechanism for establishing communication of said variable pressure chamber with said constant pressure chamber or with atmosphere in response to operation of said operating member, and an output member for outputting a propulsive power of said power piston outside of said housing as a result of movement of said power piston accompanying movement of said movable wall, said second output force generator being an actuator for displacing said output member independently of said propulsive force generated by said power piston in response to operation of said valve mechanism accompanying operation of said operating member.*

*19. The apparatus as defined in claim 18, wherein said actuator applies a pre-set auxiliary output force to said output member upon actuation of said actuator.*

*20. An apparatus for use in a vehicle to boost brake pressure during a normal braking operation and an emergency braking condition, comprising:*

*an operating member for receiving an input force;*

*and an output force generator for generating an output force as a braking power;*

*said output force generator generating an output force in response to operation of the operating member during the normal braking operation in which, on an operational line diagram having said input and said output force as two coordinates, a locus of said output force relative to said input force follows a first operational line, said output force generator generating an output force during the emergency braking condition in which the locus of said output force relative to said input force follows a second operational line on said operational line diagram that is different from said first operational line, the second operational line having a first portion defining a basic gradient in which an increase in the input force produces an equal increase in the output force; and*

*said second operational line having a second portion in which a differential coefficient of said output force with respect to said input force is greater than said basic gradient, and the output force on the second portion of said second operational line corresponding to a first input force is always greater than the output force on said first operational line corresponding to said first input force.*

*21. The apparatus as defined in claim 20, wherein said output force generator is a booster that generates said output force to assist at least said input force received by said operating member.*

*22. The apparatus as defined in claim 21, wherein said booster has a housing in which is defined a pressure chamber, and including a movable wall disposed in said housing for movement relative to said housing and dividing said pressure chamber into a constant pressure chamber communicated with a negative pressure source and a variable pressure chamber selectively communicated with said constant pressure chamber or atmosphere, a power piston connected to said movable wall, a valve mechanism for selectively establishing communication of said variable pressure chamber with said constant pressure chamber or with atmosphere in response to operation of said operating member, and an output member for outputting a propulsive power of said power piston as a result of movement of said movable wall.*

*23. The apparatus as defined in claim 20, wherein a difference between the output force on said first operational line of said operational line diagram that corresponds to a second input force and the output force on said second operational line of said operational line diagram that corresponds to said second input force is larger than a difference between the output force on said first operational line that corresponds to the first input force and the output force on said second operational line that corresponds to the first input force.*

*24. An apparatus for use in a vehicle to produce braking assisting pressure, comprising:*

*an operating member for receiving an input force;*

*a first output force generator for generating a first output force as a part of a braking power in response to operation of said operating member; and*

*a second output force generator for generating a second output force as a part of said braking power independently of operation of said operating member;*

*said first and second output force generators producing a braking force so that on an operational line diagram having said input force and said braking power as two coordinates, a locus of said braking power with respect to said input force follows a first operational line when only said first output force generator is in operation and said locus of said braking power with respect to said input force follows a second operational line when at least said second output force generator is in operation, said second operational line having a first portion defining a basic gradient in which an increase in the input force produces an equal increase in braking power, said second operational line having a second portion in which a differential coefficient of said braking power versus said input force is greater than said basic gradient, the braking power on the second portion of the second operational line corresponding to a first input force is always greater than the braking power on the first operational line corresponding to said first input force.*

*25. The apparatus as defined in claim 24, wherein said second output force generator adds said second output force to said first output force generated by said first output for generator, and said locus follows said second operational line when said first output force generator and said second output force generator are in operation.*

*26. The apparatus as defined in claim 25, wherein said first output force generator is a booster for generating said first output force to assist at least said input force received by said operating member.*

*27. The apparatus as defined in claim 24, wherein said second output force generator is operated in response to an emergency braking condition.*

*28. The apparatus as defined in claim 24, wherein a difference between a braking power corresponding to a second input force on said first operational line of said operational line diagram and a braking power corresponding to said second input force on said second operational line of said operational line diagram is greater than a difference between a braking power corresponding to a first input force on said first operational line and a braking power corresponding to said first input force on said second operational line.*

*29. The apparatus as defined in claim 24, wherein said first output force generator is a vacuum booster comprising a housing in which is defined a pressure chamber, a movable wall disposed in said housing for movement relative to said housing and dividing said pressure chamber into a constant pressure chamber communicated with a negative pressure source and a variable pressure chamber selectively communicated with said constant pressure chamber or atmosphere, a power connected to said movable wall, a valve mechanism for establishing communication of said variable pressure chamber with said constant pressure chamber or with atmosphere in response to operation of said operating member, and an output member for outputting a propulsive power of said power piston outside of said housing as a result of movement of said power piston accompanying movement of said movable wall, said second output force generator being an actuator for displacing said output member independently of said propulsive force generated by said power piston in response to operation of said valve mechanism accompanying operation of said operating member.*

*30. The apparatus as defined in claim 29, wherein said actuator applies a pre-set auxiliary output force to said output member upon actuation of said actuator.*

* * * * *